United States Patent
Yamamoto et al.

[11] 3,812,257
[45] May 21, 1974

[54] URICOSURIC AGENT

[75] Inventors: Michihiro Yamamoto; Shunji Aono; Hiroshi Nakatani, all of Toyonaki; Shigeaki Morooka, Masao Koshiba, Shigeho Inaha, all of Takarazuka; Akira Aisaka, Minoo; Hisao Yamamoto, Nishinomiya, all of Japan

[73] Assignee: Sumitomo Chemical Company, Limited, Osaka, Japan

[22] Filed: Apr. 7, 1972

[21] Appl. No.: 242,215

[52] U.S. Cl. ............................................ 424/251
[51] Int. Cl. ............................................ A61k 27/00
[58] Field of Search ............... 424/251; 260/256.4 Q

[56] References Cited
UNITED STATES PATENTS

| | | | |
|---|---|---|---|
| 3,047,462 | 7/1962 | Maillard et al. | 260/256.4 Q |
| 3,073,826 | 1/1963 | Scarborough | 260/256.4 Q |
| 3,274,194 | 9/1966 | Hayao | 260/256.4 Q |

Primary Examiner—Stanley J. Friedman
Attorney, Agent, or Firm—Richard K. Stevens

[57] ABSTRACT

Excretion of uric acid from the body can be promoted by administering an effective amount of a quinazoline derivative represented by the formula

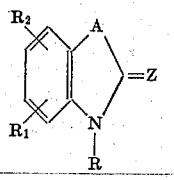

wherein R is a hydrogen atom, a lower alkyl group, a lower alkenyl group, an aralkyl group, a cycloalkyl group, a lower cycloalkylalkyl group, a lower alkoxyalkyl group, a lower alkanoyloxyalkyl group, a lower alkylthioalkyl group or a group of the formula $-C_nH_{2n}-B$ (wherein $n$ is zero or an integer of 1 to 3; B is a saturated or unsaturaged heterocyclic ring which may contain one or two hetero atoms selected from the group consisting of nitrogen, oxygen and sulfur) $R_1$ and $R_2$ are individually a hydrogen atom, a lower alkyl group, a lower alkoxy group, a trifluoromethyl group, a nitro group, a lower alkylthio group, a lower alkylsulfonyl group or a halogen atom; Z is an oxygen atom or a sulfur atom; and A is a group of the formula,

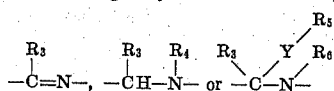

wherein $R_3$ is a phenyl group, a substituted phenyl group, a cycloalkyl group, a pyridyl group, a pyrrolyl group, a furyl group or a thienyl group; $R_4$ and $R_5$ are individually a hydrogen atom, a lower alkyl group, a lower alkenyl group, an aralkyl group, a cycloalkyl group, a lower cycloalkylalkyl group, a lower hydroxyalkyl group, a lower alkanoyloxyalkyl group, a lower alkoxyalkyl group, a lower alkylthioalkyl group, a phenyl group, a substituted phenyl group or a group of the formula

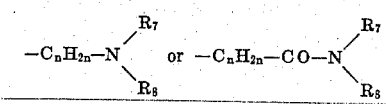

(wherein $n$ is an integer of 1 to 3; $R_7$ and $R_8$ are individually the same or different lower alkyl group, provided that $R_7$ and $R_8$ may form together with the adjacent nitrogen atom a five- or six-membered heterocyclic ring, which may further contain another nitrogen or oxygen atom); Y is an oxygen atom or a group of the formula

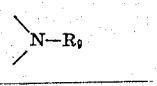

(wherein $R_9$ is a hydrogen atom or a lower alkyl group); $R_6$ is a lower alkyl group, a lower alkenyl group, an aralkyl group, a cycloalkyl group, a lower cycloalkylalkyl group, a lower hydroxyalkyl group, a lower alkanoyloxyalkyl group, a lower alkoxyalkyl group, a lower alkylthioalkyl group, a phenyl group, a substituted phenyl group or a group of the formula (wherein $n$ is an integer of 1 to 3; $R_7$ and $R_8$ are individually the same or different lower alkyl group, provided that $R_7$ and $R_8$ may form together with the adjacent nitrogen atom a five- or six-membered heterocyclic ring, which may further contain another nitrogen or oxygen atom); moreover $R_5$ and $R_6$ may form a five- to eight-membered heterocyclic ring together with the adjacent Y and nitrogen atom and the carbon atom attached to both of them, and said heterocyclic ring may contain another nitrogen or oxygen atom, and further it may be optionally substituted by one or two lower alkyl groups, which may be joined to form a benzene or cyclohexane ring, or the non-toxic salts thereof.

20 Claims, No Drawings

URICOSURIC AGENT

This invention relates to a method of controlling the uric acid content of the body using quinazoline derivatives having uricosuric activity. More particularly, this invention relates to a method of promoting excretion of uric acid by administering the quinazoline derivatives or the non-toxic salts thereof. The quinazoline derivatives used in the method of the invention can be represented by the formula,

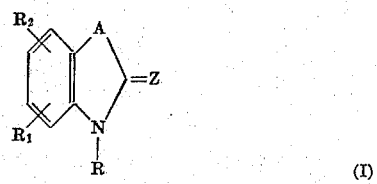

wherein R is a hydrogen atom, a lower alkyl group, a lower alkenyl group, an aralkyl group, a cycloalkyl group, a lower cycloalkylalkyl group, a lower alkoxyalkyl group, a lower alkanoyloxyalkyl group, a lower alkylthioalkyl group or a group of the formula $-C_nH_{2n}-B$ (wherein $n$ is zero or an integer of 1 to 3; B is a saturated or unsaturated heterocyclic ring which may contain one or two hetero atoms selected from the group consisting of nitrogen, oxygen and sulfur); $R_1$ and $R_2$ are individually a hydrogen atom, a lower alkyl group, a lower alkoxy group, a trifluoromethyl group, a nitro group, a lower alkylthio group, a lower alkylsulfonyl group or a halogen atom; Z is an oxygen atom or a sulfur atom; and A is a group of the formula,

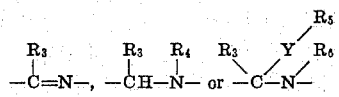

wherein $R_3$ is a phenyl group, a substituted phenyl group, a cycloalkyl group, a pyridyl group, a pyrrolyl group, a furyl group or a thienyl group; $R_4$ and $R_5$ are individually a hydrogen atom, a lower alkyl group, a lower alkenyl group, an aralkyl group, a cycloalkyl group, a lower cycloalkylalkyl group, a lower hydroxyalkyl group, a lower alkanoyloxyalkyl group, a lower alkoxyalkyl group, a lower alkylthioalkyl group, a phenyl group, a substituted phenyl group or a group of the formula

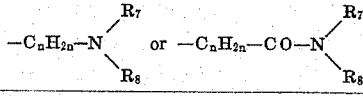

(wherein $n$ is an integer of 1 to 3; $R_7$ and $R_8$ are individually the same or different lower alkyl group, provided that $R_7$ and $R_8$ may form together with the adjacent nitrogen atom a five- or six-membered heterocyclic ring, which may further contain another nitrogen or oxygen atom); Y is an oxygen atom or a group of the formula

(wherein $R_9$ is a hydrogen atom or a lower alkyl group); $R_6$ is a lower alkyl group, a lower alkenyl group, an aralkyl group, a cycloalkyl group, a lower cycloalkylalkyl group, a lower hydroxyalkyl group, a lower alkanoyloxyalkyl group, a lower alkoxyalkyl group, a lower alkylthioalkyl group, a phenyl group, a substituted phenyl group or a group of the formula

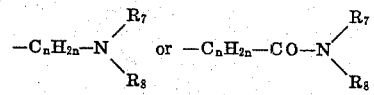

(wherein $n$ is an integer of 1 to 3; $R_7$ and $R_8$ are individually the same or different lower alkyl group, provided that $R_7$ and $R_8$ may form together with the adjacent nitrogen atom a five- or six-membered heterocyclic ring, which may further contain another nitrogen or oxygen atom); moreover $R_5$ and $R_6$ may form a five- to eight-membered heterocyclic ring together with the adjacent Y and nitrogen atom and the carbon atom attached to both of them, and said heterocyclic ring may contain another nitrogen or oxygen atom, and further it may be optionally substituted by one or two lower alkyl groups, which may be joined to form a benzene or cyclohexane ring.

In the compounds represented by the formula [I], the term alkyl means both straight and branched chain aliphatic hydrocarbon radicals, and the lower alkyl group includes, for example, methyl, ethyl, n-propyl, isopropyl, n-butyl, isobutyl and tert-butyl groups; the lower alkenyl group includes, for example, allyl, methallyl, 2-butenyl, 3-butenyl and 3,3-dimethylallyl groups; the aralkyl group includes, for example, benzyl, phenethyl, halobenzyl, lower alkylbenzyl, lower alkoxybenzyl and nitrobenzyl; the cycloalkyl group includes, for example, cyclopropyl, cyclobutyl, cyclopentyl, cyclohexyl, cycloheptyl and cyclooctyl groups; the lower cycloalkylalkyl group includes, for example, cyclopropylmethyl, cyclopropylethyl, cyclobutylmethyl, cyclopentylmethyl, cyclohexylmethyl, cycloheptylmethyl and cyclooctylmethyl groups; the lower alkoxyalkyl group includes, for example, methoxymethyl, methoxyethyl, methoxypropyl, ethoxymethyl, ethoxyethyl, n-propoxyethyl, isopropoxymethyl and isopropoxyethyl groups; the lower alkanoyloxyalkyl group includes, for example, acetoxyethyl and propionyloxyethyl groups; the lower alkylthioalkyl group includes, for example, methylthiomethyl, methylthioethyl, ethylthioethyl and isopropylthioethyl groups; the lower alkoxy group includes, for example, methoxy, ethoxy, n-propoxy, isopropoxy, n-butoxy and tert-butoxy groups; the lower alkylthio group includes, for example, methylthio, ethylthio and isopropylthio groups; the lower alkylsulfonyl group includes, for example, methylsulfonyl, ethylsulfonyl and isopropylsulfonyl groups; the halogen atom includes fluorine, chlorine, bromine and iodine atoms; the substituted phenyl group includes, for example, halophenyl, lower alkyl phenyl, lower alkoxyphenyl and nitrophenyl groups; and the lower hydroxyalkyl group includes, for example, hydroxyethyl and hydroxypropyl. The alkylene group represented by $-C_nH_{2n}-$ is a straight chain or branched chain alkylene group having one to three carbon atoms. The heterocyclic ring represented by B described in the radical R, includes, for example, tetrahydrofuran, tetrahydropyran, oxirane, tetrahydrothiophen, pyrrolidine, piperidine, piperadine, morpholine, aziridine, furan, thiophen, oxazole, imidazol, pyridine or pyrimidine. The heterocyclic ring, which may be formed by $R_7$ and $R_8$ with the adjacent nitrogen atom, includes, for example, pyrrolidine, piperidine, piperadine and morpholine.

We have now found that these compounds have remarkably potent uricosuric activity, which has never reported in any literature. Thus it is an object of the present invention to provide novel use of the quinazoline derivatives of the formula [I] as uricosuric agents. It is a further object to provide biologically active compositions containing one or more quinazoline derivatives. Other objects will be apparent from the following disclosure and discussion.

Uric acid is known as an end product of the metabolic breakdown of purines from exogenous and endogeneous sources in human body and the concentration of uric acid in serum is 2 to 5 mg per 100 ml in normal persons. When the uric acid level in serum becomes higher than normal level because of an insufficient excretion of urate from kidney or other reasons, clinical expression of gout may be induced. Thus, gout is a consequence of hyperuricaemia and characterized by urate deposition in various tissues such as synovium, cartilage, tendon and so on, and it is a chronic disease with a secondary inflammation, violent pain and joint destruction. The disease may be of the primary familial type or may be secondary to other diseases or to overproduction of urate in the body by a metabolic abnormality. Recently, gout caused by drugs that block urate excretion has greatly increased the need for uricosuric drugs.

The acute gouty attack has been treated with colchicine or corticosteroids to relieve the pain but the aim of management of the chronic gout is to decrease the uric acid content of the body by a uricosuric agent. For this purpose, cinchophene had been employed in the old days. But after the probenecid [p-(dipropylsulfamoyl)benzoic acid] was discovered to show marked effect on excretion of uric acid, it has been most widely used in the world. As a result of having extensively studied on uric acid excretion of various kinds of compounds in order to obtain more effective and lower toxic uricosuric agents, we have found as shown in below that the compounds of the formula [I] possess more marked uricosuric activities than the known drugs such as probencid and the said compounds have practically no toxic effect.

Examples of the quinazoline derivatives useful in the present invention include:

1-methyl-4-phenyl-2(1H)-quinazolinone
1-methyl-4-phenyl-6-chloro-2(1H)-quinazolinone
1-methyl-4-phenyl-7-chloro-2(1H)-quinazolinone
1-methyl-4-phenyl-8-chloro-2(1H)-quinazolinone
1-methyl-4-phenyl-6-bromo-2(1H)-quinazolinone
1-methyl-4-phenyl-6-iodo-2(1H)-quinazolinone
1-methyl-4-phenyl-6-fluoro-2(1H)-quinazolinone
1,6-dimethyl-4-phenyl-2(1H)-quinazolinone
1,7-dimethyl-4-phenyl-2(1H)-quinazolinone
1-methyl-4-phenyl-6-methoxy-2(1H)-quinazolinone
1-methyl-4-phenyl-6-trifluoromethyl-2(1H)-quinazolinone
1-methyl-4-phenyl-6-nitro-2(1H)-quinazolinone
1-methyl-4-phenyl-6-methylthio-2(1H)-quinazolinone
1-methyl-4-phenyl-6-methylsulfonyl-2(1H)-quinazolinone
1-methyl-4-phenyl-6,8-dichloro-2(1H)-quinazolinone
1-methyl-4-phenyl-6,7-dimethoxy-2(1H)-quinazolinone
1-methyl-4-(o-fluorophenyl)-6-chloro-2(1H)-quinazolinone
1-methyl-4-(m-chlorophenyl)-6-chloro-2(1H)-quinazolinone
1-methyl-4-(p-methoxyphenyl)-6-chloro-2(1H)-quinazolinone
1-methyl-4-(p-tolyl)-2(1H)-quinazolinone
1-methyl-4-(o-tolyl)-6-chloro-2(1H)-quinazolinone
1-methyl-4-cyclohexyl-6-chloro-2(1H)-quinazolinone
1-methyl-4-(2-pyridyl)-6-chloro-2(1H)-quinazolinone
1-methyl-4-(2-thienyl)-2(1H)-quinazolinone
1-methyl-4-(2-thienyl)-6-chloro-2(1H)-quinazolinone
1-methyl-4-(2-thienyl)-6-nitro-2(1H)-quinazolinone
1-methyl-4-(2-furyl)-6-chloro-2(1H)-quinazolinone
1-ethyl-4-phenyl-6-chloro-2(1H)-quinazolinone
1-ethyl-4-phenyl-6-nitro-2(1H)-quinazolinone
1-isopropyl-4-phenyl-2(1H)-quinazolinone
1-isopropyl-4-phenyl-6-chloro-2(1H)-quinazolinone
1-isopropyl-4-phenyl-7-methyl-2(1H)-quinazolinone
1-isopropyl-4-phenyl-6-nitro-2(1H)-quinazolinone
1-allyl-4-phenyl-6-chloro-2(1H)-quinazolinone
1-allyl-4-phenyl-6-nitro-2(1H)-quinazolinone
1-benzyl-4-phenyl-6-chloro-2(1H)-quinazolinone
1-benzyl-4-phenyl-6-nitro-2(1H)-quinazolinone
1-(o-chlorobenzyl)-4-phenyl-6-nitro-2(1H)-quinazolinone
1-(p-methylbenzyl)-4-phenyl-6-nitro-2(1H)-quinazolinone
1-cyclopentyl-4-phenyl-6-chloro-2(1H)-quinazolinone
1-cyclohexyl-4-phenyl-6-nitro-2(1H)-quinazolinone
1-cyclopropylmethyl-4-phenyl-6-nitro-2(1H)-quinazolinone
1-cyclopropylmethyl-4-phenyl-6-chloro-2(1H)-quinazolinone
1-cyclopropylmethyl-4-phenyl-6-methyl-2(1H)-quinazolinone
1-cyclopropylmethyl-4-phenyl-6-methoxy-2(1H)-quinazolinone
1-cyclopropylmethyl-4-phenyl-6-methylsulfonyl-2(1H)-quinazolinone
1-cyclopropylmethyl-4-phenyl-6-fluoro-2(1H)-quinazolinone
1-cyclopropylmethyl-4-phenyl-8-chloro-2(1H)-quinazolinone
1-cyclopropylmethyl-4-phenyl-6-trifluoromethyl-2(1H)-quinazolinone
1-cyclopropylmethyl-4-(p-anisyl)-6-chloro-2(1H)-quinazolinone
1-cyclopropylmethyl-4-(o-tolyl)-2(1H)-quinazolinone
1-cyclopropylmethyl-4-(2-thienyl)-6-chloro-2(1H)-quinazolinone
1-cyclopropylmethyl-4-(2-furyl)-6-chloro-2(1H)-quinazolinone
1-methoxymethyl-4-phenyl-6-chloro-2(1H)-quinazolinone
1-ethoxymethyl-4-phenyl-6-nitro-2(1H)-quinazolinone
1-(2-methoxyethyl)-4-phenyl-6-chloro-2(1H)-quinazolinone
1-(2-ethoxyethyl)-4-phenyl-6-nitro-2(1H)-quinazolinone 1-(2-isopropoxyethyl)-4-phenyl-6-nitro-2(1H)-quinazolinone
1-(2-ethoxyethyl)-4-(o-fluorophenyl)-6-chloro-2(1H)-quinazolinone
1-(2-acetoxyethyl)-4-phenyl-6-nitro-2(1H)-quinazolinone
1-(2-acetoxyethyl)-4-phenyl-6-chloro-2(1H)-quinazolinone
1-methylthiomethyl-4-phenyl-6-chloro-2(1H)-quinazolinone
1-(2-methylthioethyl)-4-phenyl-6-nitro-2(1H)-quinazolinone
1-(2-ethylthioethyl)-4-phenyl-6-chloro-2(1H)-quinazolinone
1-(2-isopropylthioethyl)-4-phenyl-6-methoxy-2(1H)-quinazolinone
1-tetrahydrofuryl-4-phenyl-6-chloro-2(1H)-quinazolinone
1-tetrahydrofurfuryl-4-phenyl-6-chloro-2(1H)-quinazolinone
1-tetrahydropyranylmethyl-4-phenyl-6-chloro-2(1H)-quinazolinone
1-furfuryl-4-phenyl-6-chloro-2(1H)-quinazolinone
1-thenyl-4-phenyl-6-nitro-2(1H)-quinazolinone
1-(2-pyridylmethyl)-4-phenyl-6-nitro-2(1H)-quinazolinone
1-(2-morphorinoethyl)-4-phenyl-6-chloro-2(1H)-quinazolinone
1-methyl-4-phenyl-6-chloro-3,4-dihydro-2(1H)-quinazolinone
1-methyl-4-phenyl-6-methyl-3,4-dihydro-2(1H)-quinazolinone
1-methyl-4-phenyl-6-methoxy-3,4-dihydro-2(1H)-quinazolinone
1-methyl-4-phenyl-6-nitro-3,4-dihydro-2(1H)-quinazolinone
1-ethyl-4-phenyl-6-chloro-3,4-dihydro-2(1H)-quinazolinone
1-isopropyl-4-phenyl-6-chloro-3,4-dihydro-2(1H)-quinazolinone
1-cyclopropylmethyl-4-phenyl-6-chloro-3,4-dihydro-2(1H)-quinazolinone
1-cyclopropylmethyl-4-phenyl-6-methoxy-3,4-dihydro-2(1H)-quinazolinone
1-cyclopropylmethyl-4-phenyl-6-methylsulfonyl-3,4-dihydro-2(1H)-quinazolinone
1-cyclopropylmethyl-4-phenyl-6-nitro-3,4-dihydro-2(1H)-quinazolinone
1-cyclopropylmethyl-4-phenyl-6-trifluoromethyl-3,4-dihydro-2(1H)-quinazolinone
1-methyl-3-ethyl-4-phenyl-6-chloro-3,4-dihydro-2(1H)-quinazolinone
1-methyl-3-cyclopropylmethyl-4-phenyl-6-chloro-3,4-dihydro-2(1H)-quinazolinone
1-methyl-3-(2-hydroxyethyl)-4-phenyl-6-chloro-3,4-dihydro-2(1H)-quinazolinone
1-methyl-3-(2-ethoxyethyl)-4-phenyl-6-nitro-3,4-dihydro-2(1H)-quinazolinone
1-methyl-3-(p-tolyl)-4-phenyl-6-chloro-3,4-dihydro-2(1H)-quinazolinone
1-methyl-3-(2-diethylaminoethyl)-4-phenyl-6-chloro-2(1H)-quinazolinone
1-methyl-3-(2-morphorinoethyl)-4-phenyl-6-chloro-3,4-dihydro-2(1H)-quinazolinone
3-(2-diethylaminoethyl)-4-phenyl-6-chloro-3,4-dihydro-2(1H)-quinazolinone
3-(3-dimethylaminopropyl)-4-phenyl-6-chloro-3,4-dihydro-2(1H)-quinazolinone
3-(2-morphorinoethyl)-4-phenyl-6-chloro-3,4-dihydro-2(1H)-quinazolinone
3-(2-piperidinoethyl)-4-phenyl-6-chloro-3,4-dihydro-2(1H)-quinazolinone
3-(2-morphorinoethyl)-4-phenyl-6-nitro-3,4-dihydro-2(1H)-quinazolinone
3-(2-hydroxyethyl)-4-phenyl-6-chloro-3,4-dihydro-2(1H)-quinazolinone
1-methyl-3-ethyl-4-methoxy-4-phenyl-6-chloro-3,4-dihydro-2(1H)-quinazolinone
1-methyl-3-(2-ethoxyethyl)-4-ethoxy-4-phenyl-6-chloro-3,4-dihydro-2(1H)-quinazolinone
9-chloro-1,2,3,10b-tetrahydro-10b-phenyl-imidazo[1,2-C]quinazolin-5(6H)-one
9-chloro-1,2,3,10b-tetrahydro-6-methyl-10b-phenyl-imidazo[1,2-C]quinazolin-5(6H)-one
9-chloro-1,2,3,10b-tetrahydro-1,6-dimethyl-10b-phenyl-imidazo[1,2-C]quinazolin-5(6H)-one
10-chloro-1,2,3,4,7,11b-hexahydro-11b-phenyl-6H-pyrimido[1,2-C]quinazolin-6-one
10-chloro-1,2,3,4,7,11b-hexahydro-7-methyl-11b-phenyl-6H-pyrimido[1,2-C]quinazolin-6-one
9-chloro-2,3,6,10b-tetrahydro-10b-phenyl-5H-oxazolo[3,2-C]quinazolin-5-one
9-nitro-2,3,6,10b-tetrahydro-10b-phenyl-5H-oxazolo[3,2-C]quinazolin-5-one
12-chloro-2,3,5,6,9,13b-hexahydro-13b-phenyl-8H-[1,6,3]dioxazocino[3,2-C]quinazolin-8-one
9-chloro-2,3,6,10b-tetrahydro-6-methyl-10b-phenyl-5H-oxazolo[3,2-C]quinazolin-5-one
9-chloro-2,3,6,10b-tetrahydro-6-methyl-10b-(o-fluorophenyl)-5H-oxazolo[3,2-C]quinazolin-5-one
9-nitro-2,3,6,10b-tetrahydro-6-methyl-10b-phenyl-5H-oxazolo[3,2-C]quinazolin-5-one
9-chloro-2,3,6,10b-tetrahydro-6-methoxymethyl-10b-phenyl-5H-oxazolo[3,2-C]quinazolin-5-one
9-chloro-2,3,6,10b-tetrahydro-6-(2-methylthioethyl)-10b-phenyl-5H-oxazolo[3,2-C]quinazolin-5-one
9-chloro-2,3,6,10b-tetrahydro-6-cyclopropylmethyl-10b-phenyl-5H-oxazolo[3,2-C]quinazolin-5-one
10-chloro-3,4,7,11b-tetrahydro-7-methyl-11b-phenyl-2H,6H-[1,3]oxazino[3,2-C]quinazolin-6-one
12-chloro-2,3,5,6,9,13b-hexahydro-9-methyl-13b-phenyl-8H-[1,6,3]dioxazocino[3,2-C]quinazolin-8-one
1-methyl-4-phenyl-6-chloro-2(1H)-quinazolinethione
1-methyl-4-phenyl-6-methyl-2(1H)-quinazolinethione
1-cyclopropylmethyl-4-phenyl-6-nitro-2(1H)-quinazolinethione
1-cyclopropylmethyl-4-phenyl-6-methoxy-2(1H)-quinazolinethione The compounds used in the present invention can be prepared by the routes exemplified in the following reaction scheme.

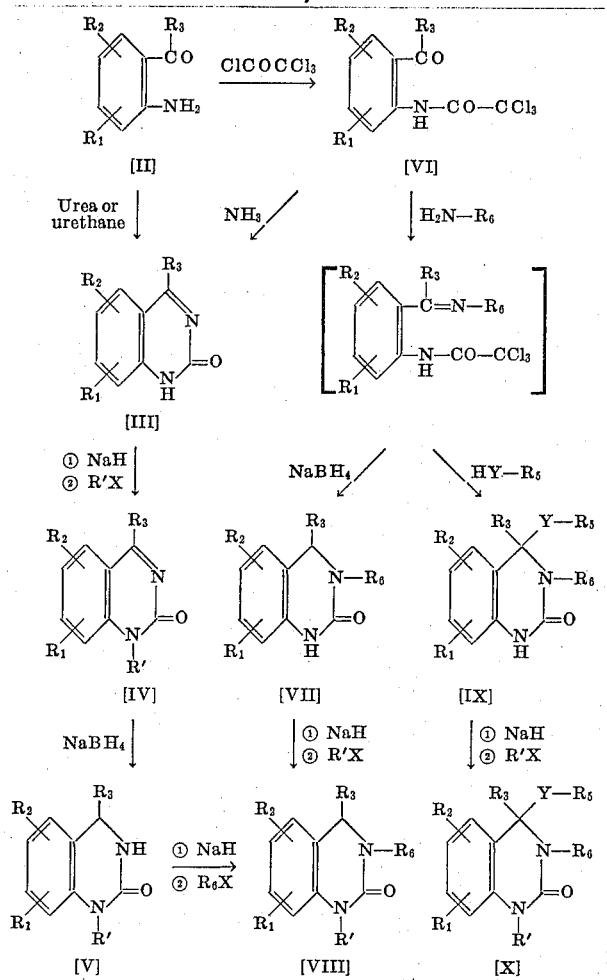

wherein $R_1$, $R_2$, $R_3$, $R_5$, $R_6$ and Y are the same as defined above; $R'$ is the same as R defined above except that it does not contain a hydrogen atom; and X is a halogen atom.

The compounds, which have a group of the formula

as A described in the formula [I], are prepared by reacting an o-aminophenyl ketone derivative of the formula [II] with urea or urethane to give a 2(1H)-quinazolinone derivative of the formula [III], treating it with sodium hydride to form a sodium salt and then treating with a compound of the formula R'X to obtain the compound of the formula [IV]. The compounds of the formula [IV] are easily reduced by sodium borohydride to yield 3,4-dihydro-2(1H)-quinazolinone derivatives of the formula [V], which are converted to the compounds of the formula [VIII] by substituting at the position 3 using sodium hydride and a compound of the formula $R_6X$. The compounds of the formula [V] and [VIII] are those which have a group of the formula

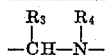

as A in the formula [I]. The compounds of the formula [VIII] can be also prepared by another route described as follows.

The o-aminophenylketone derivative of the formula [II] is trichloroacetylated to give a trichloroacetanilide derivative of the formula [VI], which may be, if desired, converted to the compound of the formula [III] by reaCting with ammonia. The compound of the formula [VI] is reacted with an amine of the formula $R_6\text{-}NH_2$ to form the condensed intermediate, which is reduced by sodium borohydride to the compound of the formula [VII]. Then, the compound is treated with sodium hydride and a compound of the formula R'X to obtain the compound of the formula [VIII].

The compounds which have a group of the formula

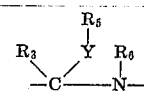

as A in the formula [I], are prepared by reacting the condensed intermediate above-mentioned with an alcohol, water or an amine derivative of the formula $R_5$-YH to give the compound of the formula [IX], and further, substituting at the position 1 using sodium hydride and a compound of the formula R'X to obtain the compound of the formula [X]. If a diamine or amino alcohol derivative is employed in place of the compounds of the formulas $R_6\text{-}NH_2$ and $R_5$-YH in the step from [VI] to [IX], there may be obtained the compound that $R_5$ and $R_6$ are joined to form a heterocyclic ring.

Moreover, these quinazolinone derivatives can be converted to the quinazolinethione derivatives by treating with phosphorus pentasulfide. This sequence of reaction may be schematically shown as follows:

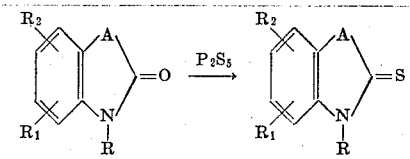

wherein $R_1$, $R_2$, R and A are the same as defined above.

The compounds of the present invention which are employed as uricosuric agents, may be administered in the form of pharmaceutical compositions.

Possible excipients are those which do not react with the present therapeutic agents, for example, water, gelatine, lactose, starch, stearic acid, magnesium stearate, talc, white petroleum, jelly, vegetable oils, alcohol, benzyl alcohol, gums, polyalkylene glycols or other pharmacologically acceptable carriers.

The pharmaceutical preparations may be, for example, in the form of tablets, power, dragees, sugar coated tablets, capsuls, suppositories, liquids, elixirs, emulsions, suspensions, syrups or the like. If desired, they are sterilized and/or contain auxiliary substances such as preservatives, stabilizers, wetting agents, detergents or buffers. They may also additionally contain other therapeutically valuable substances (e.g., chemotherapeutic agents, anti-biotics, anti-inflammatory agents, anti-pyretics, analgesics or the like). The preparations are formulated by the usual methods. The compositions and preparations should contain at least 0.1 percent of active component.

The compositions of the present invention may be administered enterally or parenterally. The dosage of the present therapeutic agents may vary from 0.2 to 50 mg per kg of body weight per day with the form of administration and the particular compound chosen.

The invention is illustrated by the following Example of more preferred embodiments thereof, but it is not intended to limit the scope of the invention.

EXAMPLE

Effect on uric acid excretion in mice

Mice of ddN strain, weighing 18 g to 20 g, were used. After the intravenous injection of 20 mg per kilogram of body weight of uric acid, they were given oral dose of test compounds in amount of 100 mg per kilogram of body weight. Urine of each group of mice, consisted of 4 animals each, was collected for 5 hours following the dose and the concentration of uric acid in urine was determined by Caraway's method (W. T. Caraway: American Journal of Clinical Pathology, volume 25, page 840 (1955)).

The results are shown in Table 1. All of the compounds of the present invention showed greater excretion of uric acid than reference compound, probenecid.

Table 1 — Effect on excretion of uric acid in mice

| Compounds | Uric acid excreted ($\mu$g/100g of body weight) |
|---|---|
| (1) 1-Methyl-4-phenyl-6-chloro-2(1H)-quinazolinone | 45.7 |
| (2) 1-Isopropyl-4-phenyl-6-chloro-2(1H)-quinazolinone | 42.2 |
| (3) 1-Cyclopropylmethyl-4-phenyl-6-methyl-2(1H)-quinazolinone | 32.9 |
| (4) 1-Cyclopropylmethyl-4-phenyl-6-methoxy-2(1H)-quinazolinone | 35.5 |
| (5) 1-Cyclopropylmethyl-4-phenyl-8-chloro-2(1H)-quinazolinone | 29.6 |
| (6) 1-Cyclopropylmethyl-4-phenyl-6-nitro-2(1H)-quinazolinone | 50.7 |
| (7) 1-Cyclopropylmethyl-4-phenyl-6-methylsulfonyl-2(1H)-quinazolinone | 87.5 |
| (8) 1-Cyclopropylmethyl-4-(p-anisyl)-6-chloro-2(1H)-quinazolinone | 53.5 |
| (9) 1-Cyclopropylmethyl-4-(p-tolyl)-2(1H)-quinazolinone | 46.9 |
| (10) 1-Cyclopropylmethyl-4-(2-thienyl)-6-chloro-2(1H)-quinazolinone | 29.1 |
| (11) 1-Cyclopropylmethyl-4-(2-pyridyl)-6-chloro-2(1H)-quinazolinone | 92.0 |
| (12) 1-Methoxymethyl-4-phenyl-6-chloro-2(1H)-quinazolinone | 89.1 |
| (13) 1-(2-Ethoxyethyl)-4-phenyl-6-nitro-2(1H)-quinazolinone | 41.8 |
| (14) 1-(2-Ethoxyethyl)-4-(o-fluorophenyl)-6-chloro-2(1H)-quinazolinone | 34.6 |
| (15) 1-(2-Acetoxyethyl)-4-phenyl-6-chloro-2(1H)-quinazolinone | 88.9 |
| (16) 1-Allyl-4-phenyl-6-nitro-2(1H)-quinazolinone | 29.6 |
| (17) 1-Tetrahydrofurfuryl-4-phenyl-6-nitro-2(1H)-quinazolinone | 29.0 |
| (18) 1-Cyclopropylmethyl-4-phenyl-6-chloro-3,4-dihydro-2(1H)-quinazolinone | 31.2 |
| (19) 1-Cyclopropylmethyl-4-phenyl-6-trifluoromethyl-2(1H)-quinazolinone | 52.9 |
| (20) 3-(2-Diethylaminoethyl)-4-phenyl-6-chloro-3,4-dihydro-2(1H)-quinazolinone | 39.4 |
| (21) 3-(2-Morphorinoethyl)-4-phenyl-6-chloro-3,4-dihydro-2(1H)-quinazolinone | 29.8 |
| (22) 12-Chloro-2,3,5,6,9,13b-hexahydro-13b-phenyl-8H-[1,6,3]dioxazocino[3,2-C]-quinazoline-8-one | 32.3 |
| (23) 9-Chloro-1,2,3,10b-tetrahydro-6-methyl-10b-phenyl-5H-oxazolo[3,2-C]quinazolin-5-one | 57.8 |
| (24) 9-Chloro-2,3,6,10b-tetrahydro-6-(2-methylthioethyl)-10b-phenyl-5H-oxazolo[3,2-C]quinazolin-5-one | 60.2 |
| (25) 9-Nitro-2,3,6,10b-tetrahydro-6-methyl-10b-phenyl-5H-oxazolo[3,2-C]quinazolin-5-one | 53.7 |
| Probenecid | 24.4 |
| Non-medicated control | 14.4 |

What is claimed is:

1. A method of controlling the uric acid content of the body, which comprises
administering to a human an effective amount of a compound selected from the group consisting of a quinazoline derivative represented by the formula:

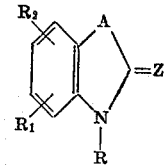

and a non-toxic salt thereof
wherein R is hydrogen, lower alkyl, lower alkenyl, aralkyl, cycloalkyl, lower cycloalkylalkyl, lower alkoxyalkyl, lower alkanoyloxyalkyl or lower alkylthioalkyl; $R_1$ and $R_2$ are individually hydrogen, lower alkyl, lower alkoxy, trifluoromethyl, nitro, lower alkyl thio, lower alkylsulfonyl, or halogen; Z is an oxygen or a sulfur atom; and A is a group of the formula

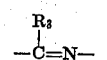

wherein $R_3$ is phenyl, substituted phenyl, cycloalkyl, pyridyl, pyrrolyl, furyl, or thienyl.

2. The method of claim 1 in which there is employed a compound of the formula

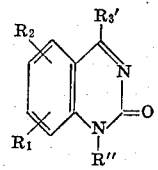

wherein R'' is lower alkyl, lower alkenyl, aralkyl, lower cycloalkylalkyl, lower alkoxyalkyl, lower alkanoyloxyalkyl or lower alkylthioalkyl; $R_1$ and $R_2$ are individually hydrogen, halogen, lower alkyl, lower alkoxy, trifluoromethyl, nitro, lower alkyl thio or lower alkylsulfonyl; and $R_3'$ is phenyl, halophenyl, lower alkylphenyl, lower alkoxyphenyl, cycloalkyl, pyridyl, furyl, or thienyl.

3. The method according to claim 2, in which the compound is 1-methyl-4-phenyl-6-chloro-2(1H)-quinazolinone.

4. The method according to claim 2, in which the compound is 1-methyl-4-phenyl-6-nitro-2(1H)-quinazolinone.

5. The method according to claim 2, in which the compound is 1-isopropyl-4-phenyl-6-chloro-2(1H)-quinazolinone.

6. The method according to claim 2, in which the compound is 1-allyl-4-phenyl-6-nitro-2(1H)-quinazolinone.

7. The method according to claim 2, in which the compound is 1-cyclopropylmethyl-4-phenyl-6-methyl-2(1H)-quinazolinone.

8. The method according to claim 2, in which the compound is 1-cyclopropylmethyl-4-phenyl-6-methoxy-2(1H)-quinazolinone.

9. The method according to claim 2, in which the compound is 1-cyclopropylmethyl-4-phenyl-6-nitro-2(1H)-quinazolinone.

10. The method according to claim 2, in which the compound is 1-cyclopropylmethyl-4-phenyl-6-methylsulfonyl-2(1H)-quinazolinone.

11. The method according to claim 2, in which the compound is 1-cyclopropylmethyl-4-(p-tolyl)-2(1H)-quinazolinone.

12. The method according to claim 2, in which the compound is 1-cyclopropylmethyl-4-(p-anisyl)-6-chloro-2(1H)-quinazolinone.

13. The method according to claim 2, in which the compound is 1-cyclopropylmethyl-4-(2-thienyl)-6-chloro-2(1H)-quinazolinone.

14. The method according to claim 2, in which the compound is 1-cyclopropylmethyl-4-(2-pyridyl)-6-chloro-2(1H)-quinazolinone.

15. The method according to claim 2, in which the compound is 1-methoxymethyl-4-phenyl-6-chloro-2(1H)-quinazolinone.

16. The method according to claim 2, in which the compound is 1-(2-ethoxyethyl)-4-phenyl-6-nitro-2(1H)-quinazolinone.

17. The method according to claim 2, in which the compound is 1-(2-ethoxyethyl)-4-(o-fluorophenyl)-6-chloro-2(1H)-quinazolinone.

18. The method according to claim 2, in which the compound is 1-ethoxymethyl-4-phenyl-6-nitro-2(1H)-quinazolinone.

19. The method according to claim 2, in which the compound is 1-(2-acetoxyethyl)-4-phenyl-6-chloro-2(1H)-quinazolinone.

20. The method according to claim 2 in which there is employed a 1-lower cycloalkylalkyl-4-(2-pyridyl)-6-halogeno-2(1H)-quinazolinone.

* * * * *